July 10, 1962  J. W. KLOPP ETAL  3,043,263
RELEASE MECHANISM FOR EJECTING SEA SURVIVAL EQUIPMENT
FROM DITCHED OR CRASHED AIRCRAFT
Filed Oct. 5, 1960  2 Sheets-Sheet 2

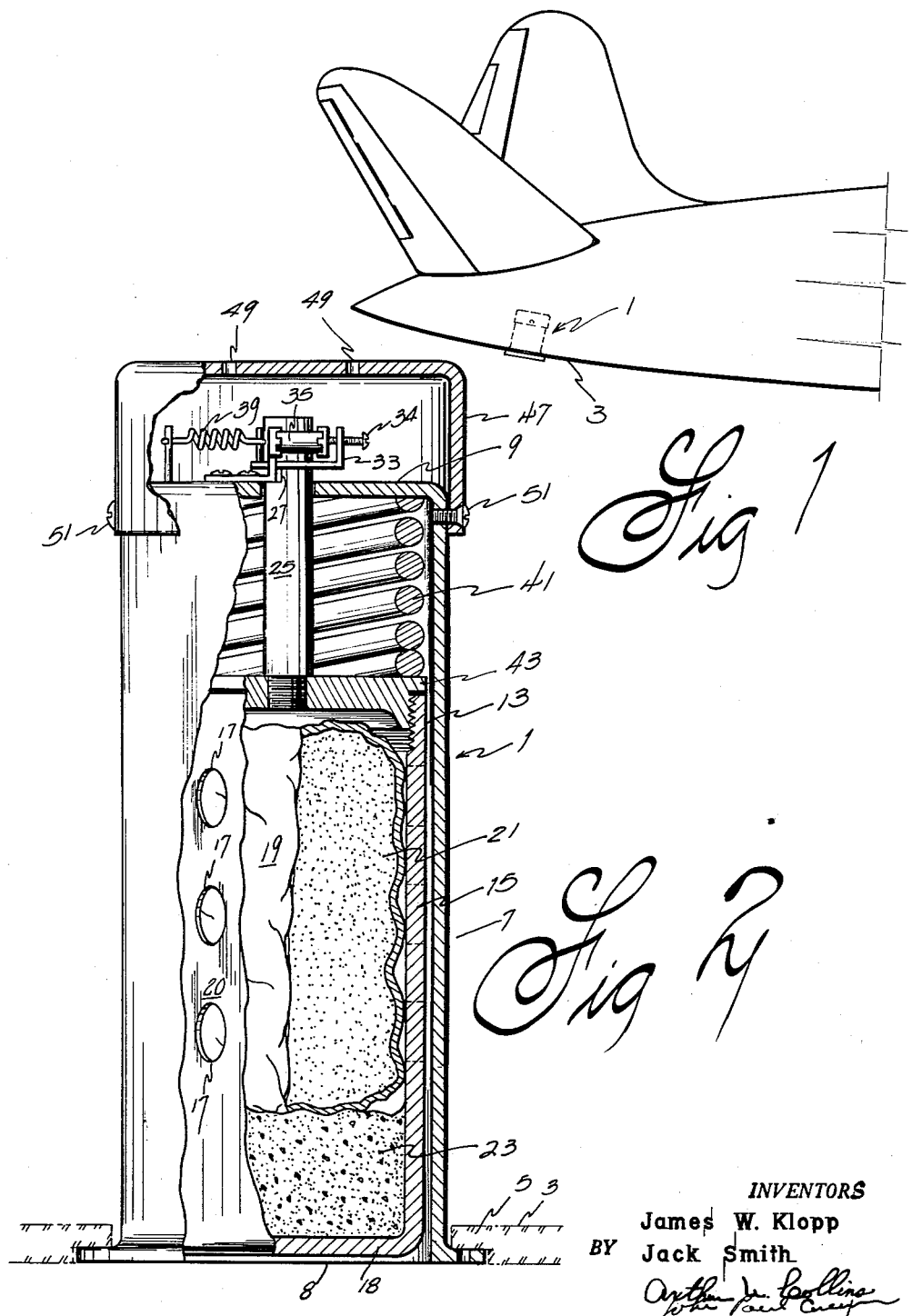

INVENTORS
James W. Klopp
Jack Smith
BY
ATTORNEYS 3,043,263
RELEASE MECHANISM FOR EJECTING SEA SURVIVAL EQUIPMENT FROM DITCHED OR CRASHED AIRCRAFT
James W. Klopp, Broomall, Pa., and Jack Smith, Haddonfield, N.J., assignors to the United States of America as represented by the Secretary of the Navy
Filed Oct. 5, 1960, Ser. No. 60,756
3 Claims. (Cl. 116—124)
(Granted under Title 35, U.S. Code (1952), sec. 266)

The invention described herein may be manufactured and used by or for the Government of the United States of America for governmental purposes without the payment of any royalties thereon or therefor.

This invention relates to air-sea rescue devices and more particularly to a new and improved release mechanism for ejecting a position indicator to the sea to assist searchers in spotting the survivors of crashed aircraft.

It is well known that it is very difficult to locate objects at sea particularly when it is rough. For this reason, the survivors of crash landings at sea stand little chance of being seen and rescued unless an identifiable mark is formed upon the water.

Heretofore, these crash markers where released to the surface of the sea by mechanisms which were responsive to hydrostatic pressure, inertia forces, or manual means in order to activate them. However, in many cases the aircraft may sink before such marking means could be released. For aviators and others who are forced down at sea, the present invention is of particular importance and, due to its automatic operation, it is effective no matter what local conditions may exist.

Therefore, an object of this invention is to provide an improved ejection mechanism having a releasable buoy mechanism which is automatically ejected from the craft upon submerging thereof, which buoy may contain a quantity of dye for coloring the water surface.

A further object of this invention is to provide a release mechanism which is responsive to the disintegrating action of water for ejecting a marking buoy onto the surface of a body of water.

A further object of the invention is to provide a release mechanism capable of being adjusted to provide for predetermined release times.

A further object of the invention is to provide a release mechanism which is simple in construction positive in actuation and which automatically initiates the release of a buoy to the surface of the sea upon submerging therein.

A further object is to provide a buoy which will float along with the survivors of an air-crash and which will release a dye at a predetermined rate onto the surface of the sea thereby making it easier for air-sea rescue teams to spot the survivors.

A further object of the invention is to provide an improved ejection mechanism and marker buoy which can be mounted in the aircraft fuselage flush with the skin in such a manner that the streamlining of the aircraft is not affected thereby.

Various other objects and advantages will be apparent from the following description of one embodiment of the invention, and the novel features will be particularly pointed out hereinafter in connection with the appended claims. In the drawings accompanying and forming a part of this specification, wherein are shown two forms of the invention, wherein like characters of reference indicate the same parts in all of the views:

FIG. 1 is a perspective view of a section of an aircraft on which our invention is illustrated;

FIG. 2 is a partial longitudinal sectional view with parts broken away taken through one embodiment of the invention showing the same in assembled condition;

Figure 3:
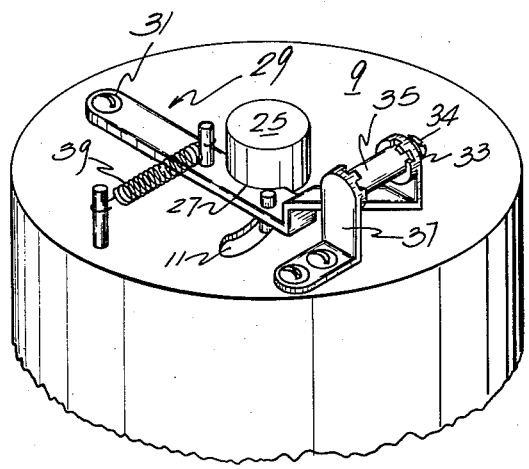
FIG. 3 is a fragmentary perspective view of the top portion of the release mechanism with the cover removed.

Referring more particularly to FIGS. 1, 2 and 3 of the drawing the ejector-buoy unit 1 is secured to the airplane's fuselage 3, and is preferably mounted the tail section of the fuselage to prevent entanglement of the buoy when it is released. In order to secure the unit 1 in place, a mounting platform or flange 5 is provided which is securely affixed to the fuselage of the plane in any suitable manner, such as by aircraft rivets. A cylindrical housing 7 having an open end 8 and a base member 9 is integrally secured to the mounting platform and extends upwardly into a recess in the plane's fuselage as shown in FIG. 1. The base member 9 of housing 7 contains an aperture 11 in the top thereof.

Mounted within the lower end of the housing 7 is a buoy assembly 13. The buoy assembly includes a canister 15 having an integral bottom 18 a wall member 20 having a number of predetermined size holes or perforations 17 therein and an open top. A sack 19 or the like, which is permeable to the action of water, contains a sodium fluorescein dye 21. Any marker such as is described in Letters Patent of R. L. Tuve, Patent No. 2,675,776, issued April 20, 1954 could be used with this ejection-buoy unit. This sack of water soluble fluorescent substance is placed inside of the canister 15. This dye is dissolved by the water which enters through the hole 17 when the buoy assembly is ejected from the housing 7. A foam plastic 23 or other suitable buoyant material is located in the base of the canister in sufficient amount to give buoyancy to the canister 15 after it is ejected.

The release mechanism includes a tubular release member or plunger 25 which is positioned in the upper end of the housing 7. The top 27 of the plunger is notched and it extends above the base member 9 shown in FIG. 3. An arm 29 is pivotally secured at one side of the base member 9 as shown at 31 in FIG. 3. The arm 29 is slidably located in the slot 11 at the other side of the base member 9. When the release mechanism is in engaged position as shown in FIGS. 2 and 3, the arm 29 is held by the tablet 35 placed between the arm 33 and a back-stop 37 which extends upwardly from the side of base member 9. An adjustable screw-jack 34 passes through arm 29 and can be adjusted to receive pellets of varying thicknesses. A spring 39 positioned between arm 29 and back-stop 37 applies initial compression on table 35. When in this position, the arm 29 engages in notch 27 in the plunger 25.

A helical compression spring 41 is spirally wound about the outer periphery of the plunger 25 and is compressed between the base member 9 and the cap 43. The cap is connected in any suitable manner to the end of the plunger 25 such as by screw means 33. The container 15 is threaded at the top and screws into cap 43 when the unit 1 is finally assembled. To prevent inadvertent actuation of the device, a covering 47 having apertures 49 in the top thereof is secured to the base member by means of screws 51 or other like means.

The tablet 35 is made of a mixture of fuller's earth and hexanhexol also known as d-mannitol. The mixture is compressed into a tablet under varying pressures by an ARL Dietert pill making press. The concentrations of the mixtures and the pressures under which it is compressed are varied to provide different release times for the buoy.

The following table is an example of the range to which the release times of the buoy may be adjusted:

| Concentration | Packing Pressure, p.s.i. | Release Time |
| --- | --- | --- |
| 33% by weight fuller's earth 67% by weight in mannitol | 2,800 4,800 6,800 8,800 | 42.2 sec. 1 min., 24.4 sec. 1 min., 68.3 sec. 1 min., 41.1 sec. |
| 50% mannitol 50% fuller's earth | 2,800 4,800 6,800 8,800 | 35.9 sec. 1 min., 37.2 sec. 2 min., 61.7 sec. 2 min., 43.1 sec. |

The operation of the invention is now quite apparent. The buoy assembly 13 is equipped with a sack 19 containing a fluorescein dye 21. Assembly 13 is screwed into the cap 43, and the plunger 25 is pushed through the aperture 11 in the base member 9 of the housing 7 until the arm 29 engages the notch 27. This causes the spring 41 to be compressed.

A tablet 35, having the desired concentration mannitol and fuller's earth and being compressed under a suitable packing pressure to provide a desired release time, is fitted between the back-stop 37 and screw-jack 34. This tablet maintains the arm 29 in its locking position. The cover 47 is then placed over the top of the tablet and arm.

When a craft such as an airplane equipped with this device is forced down at sea and becomes submerged, water enters the aperture 49. Upon exposure to the water, the tablet 35 is disintegrated and cannot resist any longer the compression of spring 39. This causes the arm 29 to pivot so that the plunger 25 is released. The spring 41 shoots the plunger and buoy 13 into the water. Since the canister 15 is equipped with the foam plastic 23 at one end, it is sufficiently buoyant to cause the ejected buoy 13 to float in the water. The dye material in the sack 19 leaches out through the sack and passes through the holes 17 in the canister 15. This buoy assembly is unattached and floats along with the currents in the sea. This affords a marker which enables survivors of a crash to be spotted more easily.

Figure 4:
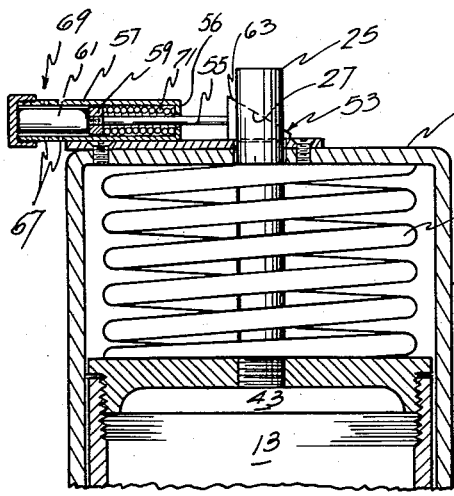
FIG. 4 is a side elevation view in cross-section showing a modified form of the release mechanism in the triggered position.

FIG. 4 shows a modified form of the invention. The modification pertains to another means of triggering plunger 25 so as to cause the buoy assembly 13 to be ejected from the housing 7. The plunger 25 protrudes up through the aperture 11 in the base member 9 of the housing 7 and is held in position by arm 55 as shown. Arm 55 extends into a housing 57 which is positioned in a suitable manner along the base member 9 of housing 7, and terminates in the head 59. A powder 61 comprising a mixture of mannitol and fuller's earth is placed in one end of the housing 57 whereby it presses against the head 59. The arm 55 is pushed toward the plunger 25 so as to engage the notch 27. The end 53 of arm 55 which makes contact with notch 27 is tapered so as to fit the contour of the notch. A spring 71 is wrapped around the portion of the arm 55 which is inside of the housing 57. The spring is compressed between the head 59 and the end 56 of housing 57. A cap 69 is screwed into the other end of housing 57 and keeps the powder intact inside of the housing. Small apertures 67 are placed in the sides of housing 57 so as to allow water to reach the powder 61. When the powder is dissolved by the action of water, this releases the compression on the spring whereby the spring unwinds pushing the head 59 toward the cap 69 causing the arm 55 to be pulled from the notch 27. This enables the plunger to be released. The subsequent ejection of the buoy assembly 13 of the modified form of the invention and the operation thereof after release is substantially identical with that of the buoy assembly of the preferred form.

The invention in its broader aspects is not limited to the specific mechanism shown and described but departures may be made therefrom within the scope of the accompanying claims without departing from the principles of the invention and without sacrificing its chief advantages.

Obviously many modifications and variations of the present invention are possible in the light of the above teachings. It is therefore to be understood that within the scope of the appended claims the invention may be practiced otherwise than as specifically described.

What is claimed is:

1. A device for releasing a marking buoy from a disabled aircraft which has fallen into a body of water, said device comprising in combination a cylindrical housing having an integral base member at one end thereof suitably mounted on the aircraft, said base member being formed with an aperture therein; an elongated plunger having a notch in one end thereof, said plunger being disposed longitudinally inside of the housing so that the said notch extends through the aperture in the base member; a canister having an integral bottom, a wall member having perforations therein and an open top, said canister being slidably positioned inside of said housing; buoyant means placed on the bottom of the canister; a sack of suitable marking dyes positioned in the canister on top of the buoyant means; a cap removably connected to said canister for closing it; thread means located in the cap for receiving the plunger therein; first spring means disposed inside of the housing between its said base member and the said cap on the canister whereby the first spring means is compressed between the cap and the base member when the canister is pulled into the housing by the plunger extending through the aperture in the base member; an arm member pivotally connected to the base member on the outside surface thereof and being adaptable to engage the notch in the plunger to prevent axial movement thereof; second spring means attached to the arm member for disengaging the arm from the notch in the plunger; means disintegrable upon contact with water suitably connected to the arm member for resisting the movement of the second spring means; a cover having perforations therein, said cover being removably connected to the base member whereby upon contact with a body of water, the water immediately enters through the perforations in the cover and disintegrates the said means resisting the action of the spring means so that the arm is disengaged from the notch in the plunger whereupon the plunger moves axially through the aperture in the base member of the housing causing the first spring means to eject both the plunger and the canister into the body of water, whereupon the canister is held afloat by the buoyant means as the dye leaches out through the said sack and passes through the perforations in the wall of the canister thereby coloring the water.

2. A device according to claim 1 wherein said disintegrable means consists of a tablet comprising at least 33% and not more than 66% by weight of hexanehexol and the balance being fuller's earth, said tablet being compressed under a pressure of from 2800 to 8800 p.s.i. in order to provide a release time for the said plunger of from forty seconds to one minute and forty seconds.

3. A device according to claim 1 wherein the disintegrable means comprises a powder consisting essentially of a mixture of 50% by weight of hexanehexol and 50% by weight of fuller's earth.

References Cited in the file of this patent

UNITED STATES PATENTS

| | | |
| --- | --- | --- |
| 2,459,267 | Dwyer | Jan. 18, 1949 |
| 2,803,838 | Wales | Aug. 27, 1957 |